Dec. 12, 1967  M. M. NOVAKOVICH  3,357,898
FLOATABLE SOLAR STILL FOR PRODUCING POTABLE
WATER FROM IMPURE WATER
Filed Dec. 3, 1964

INVENTOR.
MILAN M. NOVAKOVICH
BY
Roman A. Dihes
ATTORNEY

United States Patent Office 3,357,898
Patented Dec. 12, 1967

3,357,898
FLOATABLE SOLAR STILL FOR PRODUCING POTABLE WATER FROM IMPURE WATER
Milan M. Novakovich, Orange County, Calif.
(215 Apolena Ave., Newport Beach, Calif. 92662)
Filed Dec. 3, 1964, Ser. No. 415,740
5 Claims. (Cl. 202—234)

This invention relates to the problem of extracting pure water from polluted water. More particularly, the invention concerns an apparatus and method for removing pure potable water from sea water or sewage water.

Heretofore, the problem of extracting fresh water from sea water or other adulterated water has been attempted primarily by evaporation processes utilizing a solar still or the like having an external heat source. The primary disadvantage inherent in such processes is the excessive amount of energy input required to obtain a sufficient evaporation rate to produce an appreciable amount of fresh water. Accordingly, in these processes, additional energy must be induced into the system to increase the rate of evaporation of the liquid or a very large apparatus is required to produce a sufficient quantity of fresh water.

The invention herein provides an extremely simple yet efficient apparatus and method to recover fresh water from sea water or other adulterated liquids in sufficiently useable quantities. The apparatus contains no moving parts and is designed so that none of the essential elements in its operation are subject to salt water corrosion.

It is well known that the rate of evaporation is a function of the temperature of the liquid (the vapor tension characteristic at a given temperature) and the quantity of moisture in the atmosphere is the function of the temperature of the atmosphere (dew point).

Above a body of a liquid there exists a certain vapor pressure characteristic for the prevailing temperature and atmospheric pressure. Upon the removal of that vapor, the vapor tension at the surface of the liquid body will cause an equivalent quantity of liquid to evaporate in order to restore the disturbed thermodynamic equilibrium. The saturation point or dynamic equilibrium exists when the amount of evaporation of a liquid equals the amount of vapor which condenses back to the surface of the liquid. Thus, the efficiency of the system is a function of the ability of the system to remove the vapor formed prior to the reversion thereof to the liquid body. Therefore, it is an essential feature of the present invention to provide an apparatus and method for removing the vapor in the atmosphere above the liquid before it reverts to the liquid body. It can be seen that the present invention is not dependent solely upon solar energy but may be utilized on overcast days and even at night time. Obviously, however, the rate of condensate production would be reduced.

This result can be calculated in terms of real numbers by utilizing the following formula:

$$Z_0 = \frac{N \cdot p}{\sqrt{2\pi M R T}}$$

In this formula, $Z_0$ is the number of molecules emerging per 1 cm.² per second from a surface of a liquid under the condition that vapor is removed at the same rate as it forms (evaporation under constant pressure);

N is a constant Avogadro's number ($6.02 \times 10^{23}$);
M is the molecular weight of the liquid (18 grams for fresh $H_2O$);
R is the gas constant (84.8 grams./cm.²);
p is the vapor pressure at T temperature (kg./cm.²);
T is the absolute temperature (degrees Kelvin).

Thus, in the case of sea water, assuming the temperature of the atmosphere above the water as 59° F. (or 288° K.), the vapor pressure would then be equal to .0174 kg./cm.².

Accordingly, by the application of the foregoing formula and values, the following results would be derived:

$$Z_0 = \frac{N \cdot p}{\sqrt{2\pi M R T}}$$

$$Z_0 = \frac{6.02 \times 10^{23} \times .0174}{\sqrt{6.28 \times 18 \times 84.8 \times 288}} = \frac{6.12 \times 10^{23} \times .0174}{\sqrt{277 \times 10^4}}$$

$$Z_0 = \frac{1.05 \times 10^{22}}{16.6 \times 10^2} = \frac{1.05 \times 10^{21}}{1.66 \times 10^3} = .63 \times 10^{18}$$

$$Z_0 = 6.30 \times 10^{18} \text{ molecules/cm.}^2/\text{sec.}$$

$$\frac{Z_0}{N} = \frac{6.30 \times 10^{18}}{6.02 \times 10^{23}} = 1.05 \times 10^{-5} \text{ molecules/cm.}^2/\text{sec.}$$

$1.05 \times 10^{-5} \times 18 = 1.89 \times 10^{-4}$ gr./cm.², or .167 gal./ft.²/hr.
$1.05 \times 10^{-5} \times 18 = 1.89 \times 10^{-4}$ gr./cm.², or .167 gal./ft.²/hr.

Or, restated, to obtain a theoretical output of 1,000 gallons per hour, the surface of evaporation of approximately 6,000 square feet would be required.

It should be noted that the surface of area required to obtain the above volume of condensation refers to the total liquid surface (surface of evaporation) available for evaporation. Therefore, by increasing the liquid surface in a given system through the injection of additional liquid into the atmosphere above the liquid body, as by a spray as hereinafter described, a substantial increase in the amount of liquid surface available for evaporation would be provided, and thereby substantially increase the production of condensate. Thus, by interjecting a spray composed of the liquid into the atmosphere above the liquid body, a smaller area or system needs to be provided for the utilization of this invention to obtain a given rate of production of unadultered condensate. It should be noted that concentration of the adulteration material in the liquid body surface does not occur because of the convection effect which would cause the concentrated solution at the liquid surface to pass to the less concentrated solution thereby diluting itself to a constant level of concentration. That is, since the liquid in the caisson is a part of the sea and is in unobstructed association therewith, the sea currents and tide flow effectively remove any concentration of solid or adulterated matter (i.e. salt) in the system.

Accordingly, it is an object of the present invention to provide an extremely simple and efficient apparatus of inexpensive construction for removing pure water from salt water or sewage water.

Another object is to provide an extremely simple and efficient apparatus of inexpensive construction for removing pure water from salt or sewage water and having no moving parts.

Still another object is to provide an extremely simple and efficient apparatus of inexpensive construction for removing pure water from salt or sewage water which is capable of automatic and continuous operation free from maintenance problems.

A further object is to provide a method for continuously and automatically extracting pure water from sea water and sewage water.

Other objects and advantages will become apparent from the following description when taken in conjunction with the accompanying drawings, in which.

Figure 1:
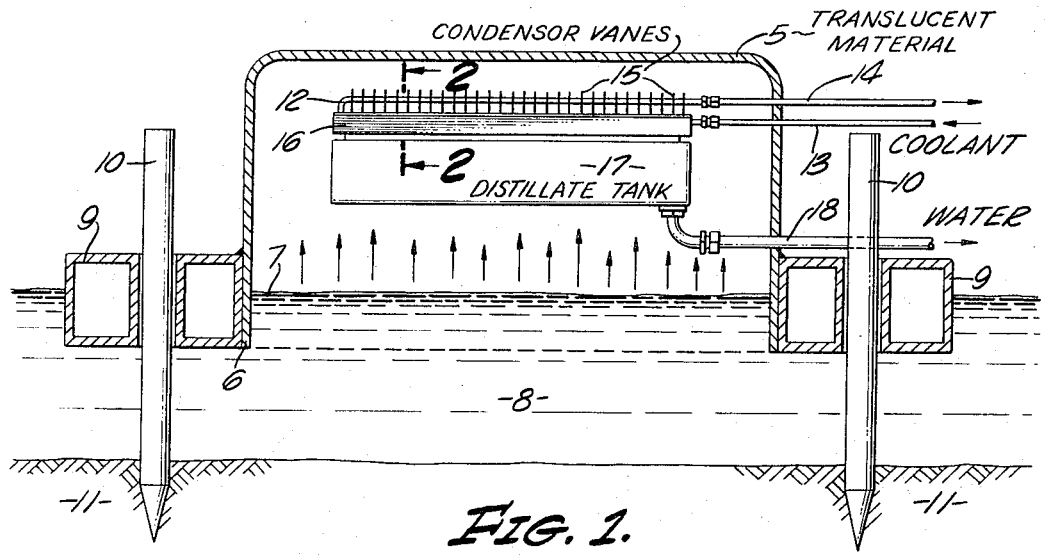
FIG. 1 is a sectioned side view of the apparatus embodying the principles of the present invention.

Referring more particularly to FIG. 1, the numeral 5 designates generally an airtight caisson or a canopy having an open face. The rim 6 defining said open face of said canopy is submerged beneath the surface 7 of the liquid body 8 thereby exposing a large liquid surface to evaporation, yet prohibiting air circulation between the atmosphere outside the canopy 5 and that inside the canopy. Thus, the atmosphere confined within the canopy 5 is always saturated with water vapor (100% humidity). Canopy 5 may be of any impervious material, but is preferably translucent so as to produce a "green house effect." That is, the moisture in the air confined inside the canopy 5 will then absorb the solar energy passing through the translucent material comprising the canopy, so as to result in an increase in the amount of vapor contained in the atmosphere above the liquid body. Consequently, a smaller unit may then be utilized to obtain the same given amount of condensate.

Further, since the atmospheric pressure inside the canopy 5 is equal to the atmospheric pressure outside the canopy, the canopy may be of any light weight construction, such as a plastic or the like.

Canopy 5 is secured to buoyant floats 9 which serve to maintain the rim 6 of the canopy 5 at a predetermined submerged depth below surface 7 of the liquid pool 8, which in FIG. 1 consists of sea water.

Figure 3:
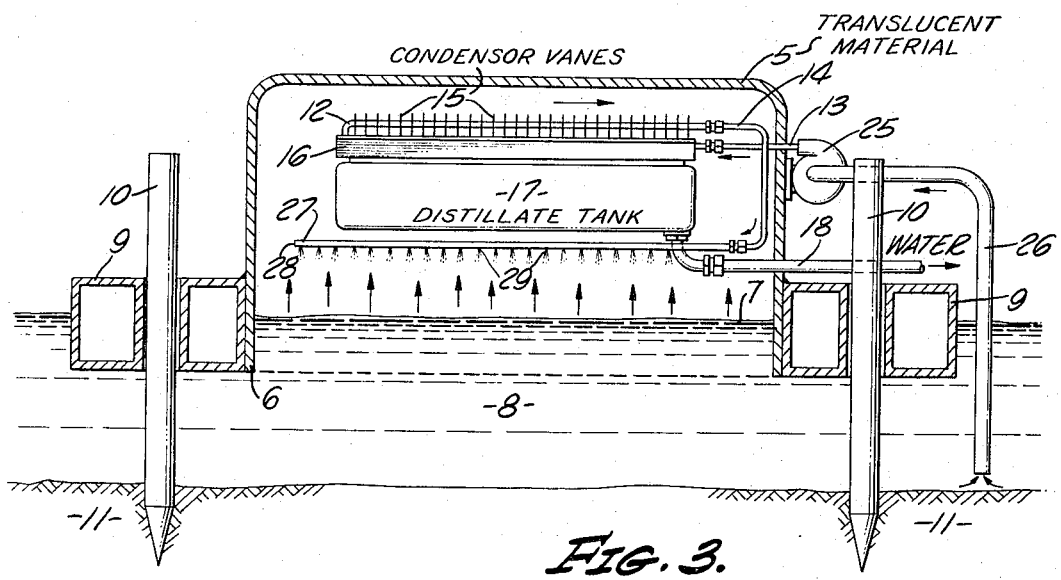
FIG. 3 is a sectioned side view of an apparatus illustrating another embodiment of the present invention showing pump and spray elements for increasing the liquid surface (surface of evaporation).

When the present invention is utilized to extract fresh water from sea water, as illustrated in FIGS. 1 and 3 herein, the apparatus is located in the sea and is stabilized at the selected site by anchor post 10 or some other suitable anchoring means. Anchor posts 10 are secured to the sea floor 11 and are in slidable engagement with floats 9. Thus, the apparatus is vertically adjustable with variations in the sea level, i.e. tides and the like, but is stabilized relative to lateral drift or movement thereof.

The condenser unit is comprised of a U tube, or some other suitable circulation means, 12 having an ingress leg 13 and an egress leg 14 through which a suitable coolant is circulated. Condenser vanes 15 are attached to U tube 12 so as to simultaneously be engaged with ingress leg 13 and egress leg 14. Thus, when the coolant is circulated through the U tube 12, the surface of the condenser vanes 15 are maintained at a temperature below the temperature of the surrounding atmosphere, thereby causing water vapor to condense on the aforesaid surfaces of the condenser vanes 15.

Figure 2:
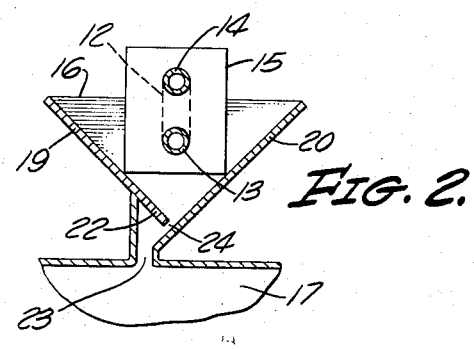
FIG. 2 is a sectioned view of the condenser element, coolant conduit and collection trough taken on the line 2—2 of FIG. 1.

The condensed water on the surfaces of the condenser vanes 15 is then allowed to drip into a collection trough 16 (as best shown in FIG. 2). Hence, draining into a collecting tank 17. The condensate is thereafter removed through outlet pipe 18 by either natural draining or pumping to the point of consumption thereof.

In order to prevent re-evaporation of the condensate to the atmosphere, the surface of the condensate exposed to the atmosphere must be kept at a minimum by a suitable collection trough design and by rapid removal thereof from the collecting tank. Accordingly, in FIG. 2, the collection trough 16 is composed of two continuous vertical sides 19 and 20 positioned in non-parallel alignment with respect to one another. Trough side 19 is provided with an overhang 22 which projects over the opening 23 leading into the collecting tank 17. The edge overhang 22 is spaced from trough side 20 so as to provide an opening 24. Thus, after vapor condenses on the faces of condenser vanes 15, condensate will then drip onto collection trough sides 19 and 20 and pass through opening 24 and collecting tank opening 23 into the collecting tank 17. It is evident from FIG. 2 that the condensate is collected quickly into the collection tank and that thereafter the condensate is no longer directly exposed to the atmosphere. Thus, the construction of the condenser and collection unit and the rapid removal of the condensate from the tank eliminates the possibility of the re-evaporation of the condensate.

In FIG. 3, the apparatus embodying the principles of the present invention is again illustrated, but with certain modifications as hereinafter described. In FIG. 3, sea water is used as a coolant. By means of a pump 25, sea water is conducted through intake pipe 26 from the lower depths of the sea where the temperature is lower than it is at the surface thereof. The sea water is then pumped into the ingress leg 13 of the condenser unit so that it is circulated through the U tube 12. As was the case of the apparatus described in FIG. 1, a coolant (in this case sea water) is thereafter circulated through egress leg 14. Egress leg 14 in FIG. 3, however, is provided with a pipe extension 27 having a closed end 28 and a plurality of small perforations or nozzles 29 therein.

Thus, as vapor is condensed on the surfaces of the condenser vanes 15, the condensed water conveys the heat of condensation to the circulating sea water. Thus, the relatively warmer sea water which leaves the condenser unit is then pumped into pipe extension 27 which projects into the atmosphere above the liquid body surface so as to spray the relatively warmer sea water into the atmosphere inside the caisson 5 thereby providing a substantial increase in the liquid surface available for evaporation. Consequently, the area covered by caisson 5 may be substantially reduced to obtain a given quantity of condensate from a given condenser unit.

Although the apparatus and method of the present invention are illustrated and described in conjunction with the removal of fresh water from sea water, the apparatus and method is equally and easily adaptable to extract fresh water from sewage water and the like.

While several embodiments of the invention and method of using same have been described, it is of course understood that the particular embodiments of the invention and method of use herein disclosed are for illustrative purposes only and that various changes may be made therein without departing from the invention and the scope thereof in the annexed claims.

I claim:
1. A purification apparatus comprising: an air tight enclosure having an open end, said open end capable of being submerged below the surface of an ambient liquid so as to captivate a quantity of air atmosphere and maintain the same in constant contact with the surface of said ambient liquid; condenser means comprised of a plurality of flat vanes positioned in said air atmosphere for condensing water vapor in said atmosphere; cooling means comprised of substantially hollow conduits for circulating fluid coolants therein attached to said condenser means; a collecting trough positioned below said condensing means; a collecting tank secured to said collecting trough; means for removing said condensed water vapor; means secured to said enclosure for buoying same at a predetermined position relative to the surface of the liquid ambient; and means engaged with said enclosure for limiting lateral movement thereof.

2. A purification apparatus as described in claim 1, wherein the collecting trough is comprised of an open-faced gutter having a bottom opening and a connecting passage between said bottom opening and the collecting tank, said bottom opening being in non-vertical alignment with said connecting passage.

3. A purification apparatus comprised as described in claim 1 wherein means are positioned in said enclosure for injecting said liquid ambient into the air atmosphere therein.

4. A purification apparatus as described in claim 3, wherein said injection means is comprised of a spray or the like.

5. A purification apparatus as described in claim 3, wherein the collecting trough is comprised of an open-faced gutter having a bottom opening and a connecting passage between said bottom opening and the collecting tank, said bottom opening being in non-vertical alignment with said connecting passage.

References Cited

UNITED STATES PATENTS

| | | | |
|---|---|---|---|
| 1,831,233 | 11/1931 | Ehrhart | 202—185 X |
| 2,412,466 | 12/1946 | Miller | 202—234 |
| 2,424,142 | 7/1947 | Bimpson et al. | 202—234 X |
| 2,636,129 | 4/1953 | Agnen | 202—185 X |
| 2,820,744 | 1/1958 | Lighter | 202—234 |
| 2,975,107 | 3/1961 | Friedman | 202—234 X |
| 3,080,302 | 3/1963 | Rogers et al. | |
| 3,138,546 | 6/1964 | Muller | 203—10 X |
| 3,248,307 | 4/1966 | Walford | 202—185 X |
| 3,252,501 | 5/1966 | Loebel et al. | 202—11 X |
| 3,257,291 | 6/1966 | Gerber | 202—185 X |

FOREIGN PATENTS 737,909  10/1955  Great Britain.

NORMAN YUDKOFF, *Primary Examiner.*

F. E. DRUMMOND, *Assistant Examiner.*

UNITED STATES PATENT OFFICE
CERTIFICATE OF CORRECTION

Patent No. 3,357,898                                December 12, 1967

Milan M. Novakovich

It is hereby certified that error appears in the above numbered patent requiring correction and that the said Letters Patent should read as corrected below.

Column 1, line 72, for ".0174" read -- .0714 --; column 2, lines 5 to 19 should appear as shown below instead of as in the patent:

$$Z_0 = \frac{N \cdot p}{\sqrt{2\pi MRT}}$$

$$Z_0 = \frac{6.02 \times 10^{23} \times .0714}{\sqrt{6.28 \times 18 \times 84.8 \times 288}} = \frac{6.02 \times 10^{23} \times .0714}{\sqrt{277 \times 10^4}}$$

$$Z_0 = \frac{1.05 \times 10^{22}}{16.6 \times 10^2} = \frac{1.05 \times 10^{22}}{1.66 \times 10^3} = .63 \times 10^{19}$$

$$Z_0 = 6.30 \times 10^{18} \text{ molecules/cm.}^2/\text{sec.}$$

$$\frac{Z_0}{N} = \frac{6.30 \times 10^{18}}{6.02 \times 10^{23}} = 1.05 \times 10^{-5} \text{ molecules/cm.}^2/\text{sec.}$$

$$1.05 \times 10^{-5} \times 18 = 1.89 \times 10^{-4} \text{gr./cm.}^2, \text{ or } .167 \text{ gal./ft}^2/\text{hr.}$$

column 4, line 65, for "comprised" read -- comprising --.

Signed and sealed this 18th day of February 1969.

(SEAL)
Attest:

EDWARD M. FLETCHER, JR.                  EDWARD J. BRENNER
Attesting Officer                            Commissioner of Patents